United States Patent
Wassingbo et al.

(10) Patent No.: US 8,271,022 B2
(45) Date of Patent: Sep. 18, 2012

(54) WIRELESS MEDIA PLAYER

(75) Inventors: Tomas Wassingbo, Lund (SE); Heino Wendelrup, Malmo (SE)

(73) Assignee: Sony Ericsson Mobile Communications AB, Lund (SE)

( * ) Notice: Subject to any disclaimer, the term of this patent is extended or adjusted under 35 U.S.C. 154(b) by 268 days.

(21) Appl. No.: 12/622,561

(22) Filed: Nov. 20, 2009

(65) Prior Publication Data

US 2010/0070385 A1 Mar. 18, 2010

Related U.S. Application Data

(63) Continuation of application No. 11/459,026, filed on Jul. 21, 2006, now Pat. No. 7,623,502.

(60) Provisional application No. 60/804,941, filed on Jun. 16, 2006.

(51) Int. Cl.
*H04M 1/00* (2006.01)
(52) U.S. Cl. .............. 455/550.1; 455/179.1; 455/142; 455/466; 705/27; 709/203; 709/204
(58) Field of Classification Search ................. 370/338; 455/179; 709/203, 231
See application file for complete search history.

(56) References Cited

U.S. PATENT DOCUMENTS

| | | |
|---|---|---|
| 2003/0084459 A1 | 5/2003 | Buxton et al. |
| 2003/0163823 A1 | 8/2003 | Logan et al. |
| 2004/0097246 A1 | 5/2004 | Welch |
| 2005/0010635 A1* | 1/2005 | Schwesig et al. ............. 709/203 |
| 2005/0118984 A1 | 6/2005 | Akiyama et al. |
| 2006/0161621 A1* | 7/2006 | Rosenberg .................... 709/204 |
| 2006/0173974 A1* | 8/2006 | Tang ............................. 709/217 |
| 2006/0174284 A1 | 8/2006 | Na |
| 2006/0288112 A1* | 12/2006 | Soelberg et al. ............. 709/231 |
| 2007/0061409 A1 | 3/2007 | Rydenhag |
| 2007/0240030 A1* | 10/2007 | Cronstrom ................. 715/500.1 |
| 2008/0101454 A1 | 5/2008 | Luff et al. |
| 2008/0194196 A1 | 8/2008 | Angelhag et al. |

FOREIGN PATENT DOCUMENTS

| | | |
|---|---|---|
| CN | 1504049 | 6/2004 |
| WO | 02/32026 | 4/2002 |
| WO | 02/052540 | 7/2002 |
| WO | 02065778 | 8/2002 |
| WO | 03/024012 | 3/2003 |
| WO | 2004/061545 | 7/2004 |

* cited by examiner

*Primary Examiner* — David Q Nguyen
(74) *Attorney, Agent, or Firm* — Renner, Otto, Boisselle & Sklar, LLP (57) ABSTRACT

A wireless device, such as a mobile phone, and a method for operating the wireless device to access a media option. The wireless device may include a media player; a radio signal receiver system configured to receive media signals; a controller comprising a memory comprising a list of different media options, indicating media items the user is interested in taking part of and a media scanner configured to scan the radio signal receiver system to detect media content associated with the media options; a user input interface to select one media item currently indicted as detected; and a media selector configured to pass received media signals relating to the selected media item to the media player.

22 Claims, 4 Drawing Sheets

WISH PLAYLIST

| Title (Artist) | Buy | Store |
|---|---|---|
| Mambo (Helena Paparizou) | | |
| Beep (Pussycat Dolls) | | |
| TNT (AC/DC) | | √ |
| Temperature (Sean Paul) | √ | |
| ... | | |

| Title (Artist) | Buy | Store |
|---|---|---|
| WISH PLAYLIST | | |
| Mambo (Helena Paparizou) | | 🗎 |
| Beep (Pussycat Dolls) | | |
| TNT (AC/DC) | | √ |
| Temperature (Sean Paul) | √ | |
| ... | | |

Fig. 4

| Title (Artist) | Buy | Store |
|---|---|---|
| WISH PLAYLIST | | |
| Mambo (Helena Paparizou) | | 🗎 |
| Beep (Pussycat Dolls) | | |
| TNT (AC/DC) | | √ |
| Temperature (Sean Paul) | √ | |
| ... | | |

WIRELESS MEDIA PLAYER

RELATED APPLICATION DATA

This application is a continuation of U.S. patent application Ser. No. 11/459,026 filed Jul. 21, 2006, which claims the benefit of U.S. Provisional Patent Application No. 60/804,941 filed Jun. 16, 2006, the disclosures of which are incorporated herein by reference in their entireties.

FIELD OF THE INVENTION

The present invention relates to media players configured to receive wireless media signals, and to convert them to user perceivable media, such as audio or video. More specifically, the invention relates to a wireless device in which a media options list, such as a play list or a channel list may be used to scan received media signals for presentation of media to a user according to user preferences in a transparent way.

BACKGROUND

Portable media players have been provided on the market for decades. Portable radio receivers for tuning in to broadcast radio transmissions have been available for many decades. The portable cassette player became popular in the late 1970's, whereas portable CD and MD players took over the market at the later part of the $20^{th}$ century. Today, the physical media carrier is becoming more and more rare, and media is commonly stored and shared in the shape of media files. For audio mp3 is an MPEG format which is often used, particularly for music, and there are also MPEG formats used for video. An electronic device configured to read a media file and convert it to a perceivable signal, such as sound or images, will simply be referred to herein as a media player.

The common way of operating portable media players is to incorporate some form of re-writable memory, such as an insertable memory card or a built-in memory connectable to a computer for downloading media files. The memory size of the media player then determines e.g. how many music tracks that can be stored, together with the fact that higher quality files generally are larger in terms of required memory space.

In addition to live broadcast transmissions and locally stored media, another way of receiving media has become popular, and that is streaming media. Streaming media is media that is consumed, i.e. read, heard, viewed, while it is being delivered. Streaming is more a property of the delivery system than the media itself. The distinction is usually applied to media that are distributed over computer networks or radio communications networks such as 3G mobile networks.

The benefit of having many different ways of accessing media also creates problems, since ease of use for the end consumer is a crucial objective. Its is common practice today to create playlists for stored media files, and also channel lists for receivable broadcast or streamed media channels. However, to combine different sources of information, and to process media received signals, is no easy task. Nor is it straightforward for the end consumer how to operate the wireless device to select channels and types of media transmission for accessing media.

SUMMARY OF THE INVENTION

A general object of the invention is therefore to provide a solution for wireless media players in terms of handling playlists or channel lists, such that an underlying object of accessing certain media channels or media items is achieved in a transparent way.

According to a first aspect, this object is fulfilled by a wireless device, comprising a media player; a radio signal receiver system configured to receive media signals; a controller comprising a memory comprising a list of different media options, and a media scanner configured to scan the radio signal receiver system to detect media content associated with the media options.

In one embodiment the wireless device comprises a user interface, wherein the controller is configured to output an alert signal through the user interface to indicate that media content associated with the media options list has been detected by the media scanner.

In one embodiment the media options includes a plurality of different media channels, the device comprising a user interface including a display operable to present a list of media channels, wherein the controller is configured to highlight a media channel on the display responsive to the media scanner detecting reception of that media channel.

In one embodiment the media channels include radio channels.

In one embodiment the media channels include video channels.

In one embodiment the media options includes a plurality of different media items, the device comprising a user interface including a display operable to present a list of media items, wherein the controller is configured to highlight a media item on the display responsive to the media scanner detecting reception of that media item.

In one embodiment the media items include audio tracks.
In one embodiment the media items include video tracks.
In one embodiment the wireless device comprises a media recorder configurable to automatically record a media item identified in the media options list, upon the controller detecting reception of that media item.

In one embodiment the controller is configured to add a link in the media options list to the recorded media item.

In one embodiment the wireless device comprises a user interface operable to add a buy tag to a media item in the media options list, wherein the controller is configured to access a media store through the media receiver system to download media data corresponding to media items marked by a buy tag.

In one embodiment the wireless device comprises a media output configured to present received media to a user.

In one embodiment the media output comprises a display.
In one embodiment the media output comprises a speaker.
In one embodiment the media output comprises a connector to an external media presentation device.

In one embodiment the radio signal receiver system comprises a plurality of different radio signal receivers configured to receive different types radio transmission.

In one embodiment the plurality of different radio signal receivers are configured to receive media signals in different radio bands.

In one embodiment the plurality of radio signal receivers comprises a first radio signal receiver configured to receive broadcast media; a second radio signal receiver configured to receive streaming media.

In one embodiment the plurality of radio signal receivers comprises a radio signal receiver configured to receive podcast media.

In one embodiment the wireless device comprises a user interface operable to select a media channel from the list of media options; a channel selector connected to the media scanner, configured to select reception of the media channel from one of the radio signal receivers.

In one embodiment a media channel is associated with a specific key of the wireless device, independent of the type of radio signal receiver.

In one embodiment the channel selector is configured to select radio signal receiver for reception of the media channel in a preset order of preference.

In one embodiment the channel selector is configured to look for reception of a broadcast FM radio signal as a higher ranking choice, a streamed media signal as a lower ranking choice.

In one embodiment the channel selector is configured to look for reception of a podcast media signal, as a lower ranking choice than a streamed media signal.

According to a second aspect, the invention involves a method for accessing a media channel in a wireless media player, comprising the steps of:
  providing a list of different media options, where each option includes a media channel;
  selecting a media channel to present;
  receiving the media channel through a plurality of different types of radio signal receivers;
  selecting one of said different types of radio signal receivers in accordance with stored selection criteria;
  presenting the media channel as received the selected radio signal receiver.

In one embodiment a media channel is associated with a specific key of the wireless device, independent of the type of radio signal receiver.

In one embodiment the step of selecting one of said different types of radio signal receivers includes the steps of:
  selecting a broadcasted signal of the media channel as a higher ranking choice, and
  selecting a streaming media signal of the media channel as a lower ranking choice.

In one embodiment the step of selecting one of said different types of radio signal receivers includes the steps of:
  selecting a broadcasted signal of the media channel as a highest ranking choice,
  selecting a streaming media signal of the media channel received through a mobile telephony network as a second ranking choice.

In one embodiment the step of selecting one of said different types of radio signal receivers includes the steps of:
  selecting a streaming media signal of the media channel received through a WLAN as a third ranking choice.

In one embodiment the step of selecting one of said different types of radio signal receivers includes the steps of:
  selecting a podcast of the media channel as a lowest ranking choice.

In one embodiment the method comprises the step of:
  scanning said plurality of different types of radio signal receivers for the selected media channel.

According to a third aspect, the invention involves a method for accessing a media channel in a wireless media player, comprising the steps of:
  providing a playlist of different media options, where each option includes a media item;
  detecting access to one of the media items of the playlist channel through a radio signal receiver;
  outputting an access indication signal on a user interface to alert a user that said media item is accessible.

In one embodiment the step of outputting an access indication signal comprises the step of:
  presenting a highlighted indication of said media item on a display.

In one embodiment a media item is associated with a specific key of the wireless media player, independent of the type of radio signal receiver.

In one embodiment the step of outputting an access indication signal comprises the step of:
  outputting an audible alert signal.

In one embodiment the step of detecting access comprises the steps of:
  scanning a plurality of different types of radio signal receivers for access to media items of the playlist.

In one embodiment the step of detecting access comprises the steps of:
  scanning a plurality of different media channels for access to media items of the playlist.

According to a fourth aspect, the invention involves a method for accessing media channel in a wireless media player, comprising the steps of:
  providing a playlist of different media options, where each option includes a media item;
  detecting access to one of the media items of the playlist channel through a streaming radio signal receiver;
  recording the media item to a media file memory responsive to detecting access.

BRIEF DESCRIPTION OF THE DRAWING

The features and advantages of the present invention will be more apparent from the following description of the preferred embodiments with reference to the accompanying drawings, on which FIG. 1 schematically illustrates a system setup for a wireless media player incorporated in a mobile phone, and the possible access connection for reception of media to the media player, in accordance with an embodiment of the present invention.

DETAILED DESCRIPTION OF PREFERRED EMBODIMENTS

The present description relates to the field of media players capable of wireless reception of media signals. The invention will be described in the context of a mobile phone, which is best known mode of operation. However, it should be noted that the media player may indeed be capable of receiving wireless media signals without having real communication capabilities, i.e. be capable of reception but not transmission. Furthermore, it should be emphasized that the term comprising or comprises, when used in this description and in the appended claims to indicate included features, elements or steps, is in no way to be interpreted as excluding the presence of other features elements or steps than those expressly stated.

Exemplary embodiments will now be described with references made to the accompanying drawings.

Figure 1:
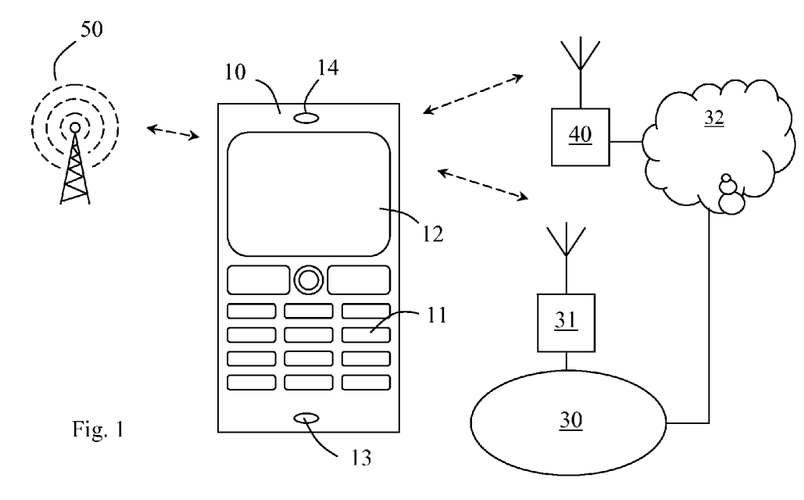
Figure 2:
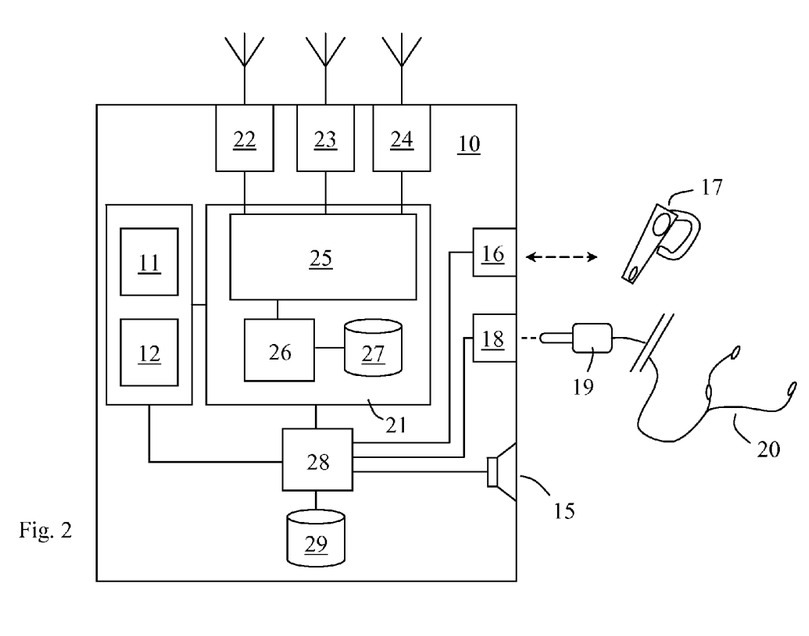
FIG. 2 schematically illustrates functional blocks of a wireless media player device in accordance with an embodiment of the present invention.

FIG. 1 illustrates the outer appearance of a typical mobile phone in which a media player according to the invention may be implemented, whereas FIG. 2 schematically illustrates functional features of the mobile phone by means of a block diagram. It should be noted that the elements indicated in FIG. 2 does not necessarily have to be physically divided in the manner shown, and that it is the functional relationship that is of primary interest. Furthermore, the outer appearance of the mobile phone need not take the indicated shape of FIG. 1, instead the mobile phone may e.g. be of a clamshell type, a jack knife type, or the like.

The media player is incorporated in a terminal 10, configured to operate in a radio communications network 30, by radio communication with a base station 31, or by direct radio communication with another terminal as a walkie-talkie. The radio communications network 30 may e.g. be a 3G network, capable of providing streaming media from the Internet 32. For streaming audio, this is already available today through many mobile phone operators. For streaming video over the mobile network, one possible technology is Multimedia Broadcast and Multicast Service (MBMS) specified in 3GPP for use in WCDMA networks. Another alternative is Broadcast and Multicast Service (BCMCS) specified in 3GPP2 for CDMA2000. Both of these technologies are known and in many aspects similar to each other, and may both be used for providing streaming video to mobile terminals over a 3G mobile phone network. The terms broadcast and multicast are used alternatively, even though they do not mean exactly the same thing. For video streaming of television channels over a 3G network using e.g. MBMS, multicast will most likely be used, as it generally would be a subscription service.

In addition, terminal 10 may be provided with a radio signal receiver configured to operate in a IEEE 802.11 WLAN to receive streaming media including audio and video from a WLAN transmitter, or access point, 40 connected to the Internet 32.

As yet another option, terminal 10 may include a receiver for receiving broadcast or multicast media signals from a broadcast station 50, such as a radio station or a television station. For traditional radio transmissions, headset cords have been used as antennas for receiving FM radio. For digital transmissions of video, DVB-h (Digital Video Broadcasting-handheld) is a technology based on DVB, which has been adopted by ETSI as a standard specification for bringing broadcast services to handheld devices, is at least partly described in ETSI EN 302 304. DVB-h is basically a mobile version of the digital technology used in digital television networks. DMB (Digital Multimedia Broadcasting) is another digital transmission system for sending data, radio and TV to mobile devices such as mobile phones, without making use of the mobile phone network. It can operate via satellite (S-DMB) or terrestrial (T-DMB) transmission. DMB is based on the Eureka 147 DAB standard and has some similarities with DVB-h.

In summary, there are a number of different ways of receiving digital media, both audio and video, which may be used in terminal 10. For the sake of simplicity, these may be referred to as different bearers, including the mobile phone network 30 e.g. using MBMS, an IEEE 802.11 WLAN 40, and separately broadcast or multicast media e.g. using DVB-h or DMB.

The terminal 10 includes a user interface comprising an input part, preferably including a set of keys 11, and additionally or optionally a touch-sensitive display. An output part of the user interface includes a display 12 for presenting information to a terminal user. For the purpose of conducting speech communication, terminal 10 further preferably includes a microphone 13 and a speaker 14. Besides speaker 14, an additional speaker 15 may be employed inter alia for the purpose of providing alert signals to a terminal user, and as a loudspeaker. Otherwise, or in addition, speakers for presenting audio, such as music, to a user are typically provided in the form of a headset which is communicatively connectable to the media player. In FIG. 2 an example of a wireless headset 17 is shown, connectable by means of Bluetooth® or the like to a radio signal transceiver 16. Furthermore, a wire-bound stereo headset 20 may be connected by means of a plug 19 into a socket 18 of the media player.

FIG. 2 illustrates the terminal 10 in the form of a block diagram. The actual function of terminal 10 as a mobile phone is not crucial to the invention, and will therefore not be described in detail. A radio signal receiver system 22, 23, 24 is included for reception of media signals from on or more radio sources using different bearers. As an example, a first radio receiver 22 includes an antenna and circuitry configured to receive broadcast or multicast media over a digital radio bearer such as a digital radio network, a DVB-h network or a DBM network. A second radio receiver 23 includes an antenna and circuitry configured to receive broadcast or multicast media over the mobile phone network in which terminal 10 is configured to communicate, where the bearer may be an MBMS connection in a WCDMA network. Furthermore, terminal 10 may include a third radio signal receiver 24 includes an antenna and circuitry configured to receive media over a direct Internet connection, e.g. using IEEE 802.11 WLAN as bearer. It should be noted, though, that in certain embodiments of the invention, the radio signal receiver system need only include the possibility of receiving media over one single bearer, such as any one of the aforementioned. The radio signal receiver system may also include only two different radio signal receivers, or more than three different receivers configured to receive media over different bearers.

The radio signal receiver system, including receivers 22, 23, 24, is connected to a controller 21, which in a preferred embodiment represents a microprocessor system with associated memory space, operation software, and application software. The actual media player function is denoted 28, and serves to transfer media signals to real media through a converter, such as a speaker or a display, dependent on the type of media. Media player 28 may therefore be connected to loudspeaker 15, or to connectors 16 or 18. Alternatively, media player 28 may be connected to display 12 of the user interface, or to a connector for connection to an external display (not shown). A media file memory 29 is connected to media player 28, for storing media files. As a power supply, terminal 10 preferably further includes a battery (not shown).

Controller 21 includes a media scanner 25, configured to scan the radio signal receiver system 22, 23, 24 to detect certain predefined media content. The predefinition of media content is stored as a list of different media options in a memory 27. The media options may e.g. be a playlist of separate media items, such as songs or other audio tracks, video segments or movies. When media scanner 25 detects that media content corresponding to a reference in the media options list is or is about to be received by the radio signal receiver system 22, 23, 24, action is taken by the controller 21. In one example, controller 21 is configured to notify or alert a user of the terminal 10 that reception of media content is possible. In another embodiment, controller 21 may be configured to record and store a received media signal responsive to detection of reception of the media signal. These embodiments will be described in more detail with reference to FIGS. 3 and 4.

As an alternative, the media options list is a list of media channels, such as radio channels or television channels. Some or all of these channels may be received through two or more different radio receivers within the radio signal receiving system 22, 23, 24. However, the quality of reception may indeed be better through one type of signal receiver than another. In fact, even if e.g. a certain radio channel is broadcasted 50 and transmitted by streaming radio 40, both of these options need not be accessible to a user at all times, e.g. due to bad coverage of one or the other system. This may also become the case during actual reception of a media signal. For instance, the user of terminal 10 may be traveling in a car, while receiving a broadcasted radio channel by means for first signal receiver 22, when suddenly the reception is interrupted or severely deteriorated. In such a scenario, controller 21 is configured to scan the other signal receivers 23, 24 for a transmission of the media channel in question, and may find that streaming media of the same channel is received by a second signal receiver 23 through the radio communications network 30, or by a third radio signal receiver 24 through a WLAN 40. A channel or media selector 26 of controller 21 then switches to receive streaming media of the channel in question from the second signal receiver 23 instead, or alternatively the third radio signal receiver 24. Should neither the first radio signal receiver 22 be capable of receiving broadcast media signal, nor the second 23 or third 24 radio signal receivers be able to receive streaming media, yet another option may be included, namely to receive a podcast of the channel in question. The podcast may be previously downloaded to memory 29, or download may be automatically initiated. The process is transparent to the user, even though the switch may be audible, or viewable in the case of video. In principle, the wireless media player according to this embodiment will act similar to RDS (Radio Data System) for VHF/FM broadcasting. A main difference, though, is that while RDS switches between different antenna stations, this embodiment scans different types of media transmission, and switches between the different types of radio transmission. For the specific case of broadcasted radio transmission, RDS is preferably still a first option to search for better sources of the channel in question, before a switch to another transmission type, such as streaming media, is executed by controller 21. In a preferred embodiment, the different types of transmission or bearers are ranked in an order of preference, as will be described for a specific example further below with reference to FIG. 5. Broadcasted media is typically free of charge, and may therefore be a highest ranking choice. Streaming media may often be accessible through the mobile operator, which generally means good coverage and high quality, to a monthly flat rate. Streaming media over the mobile network 30 may therefore be set as a second ranking option. Streaming media over a WLAN 40 may be more expensive or less accessible than over the mobile network 30, and is therefore given an even lower ranking. Podcasting is not a real time transmission, and may therefore be a lowest ranking choice. Preferably, though, these rankings can be set by the user through the user interface 11, 12 of the terminal 10.

Figure 3:
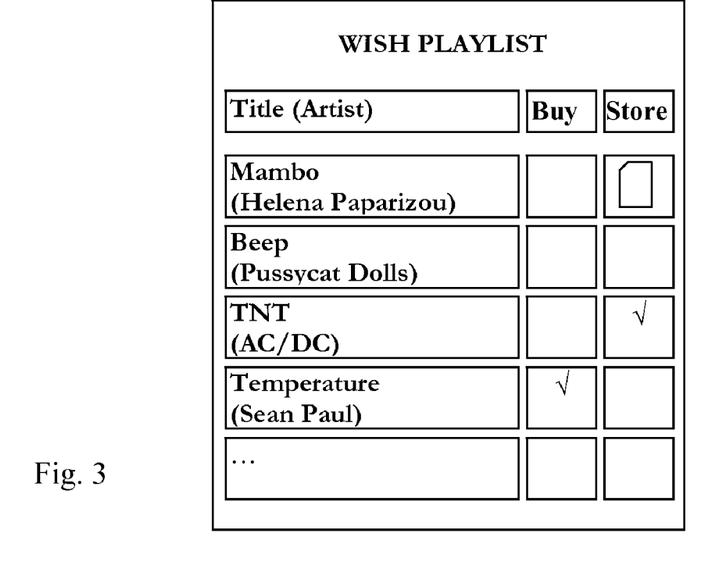
FIGS. 3 and 4 schematically illustrate a method of handling a playlist, and a method of alerting a user of a presently accessible media item in accordance with an embodiment of the invention.
Figure 4:
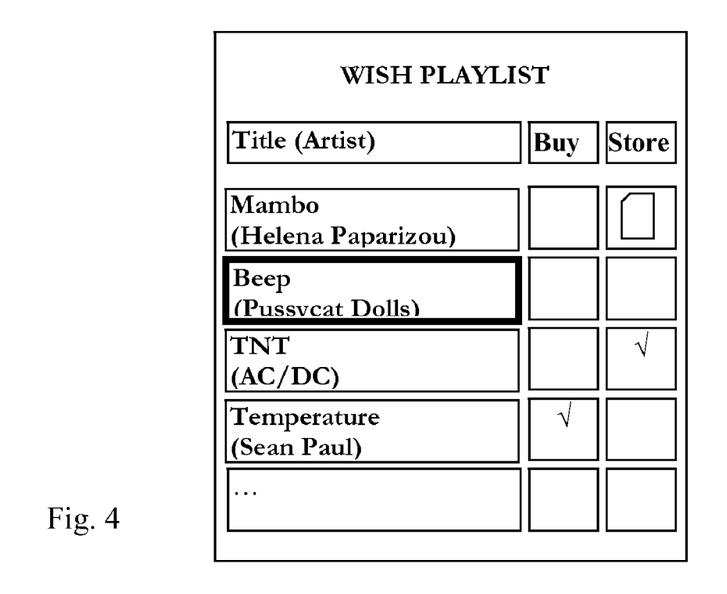

FIG. 3 schematically illustrates information of a playlist presented on a display 12 of a wireless media player, according to an embodiment of the invention. In this embodiment, the playlist is not a list entirely comprising media items stored in the media player, as is the normal case. Instead, it is a wish playlist, indicating media items the user is interested in taking part of. In the illustrated embodiment the media items are music tracks which the user currently favors, and the list may be composed by the user by means of the user interface 11, 12. Four different media items are illustrated in FIGS. 3 and 4, identified by means of title and artist. Other types of identification may be used for video items. In accordance with this embodiment, the wireless radio player is configured to run a background scanning process using media scanner 25, to detect if any of the media items in the list are provided in a received radio signal. The media scanner 25 may be configured only to scan a radio signal receiver for one bearer, such as broadcasted media signals from stations 50, or streaming media signals from a mobile phone network 30 or through a WLAN 40. It may also be configured only to scan one radio channel, either from only one transmitter 31, 40 or 50, or to scan one particular channel as received from any of those transmitters. Preferably, though, media scanner 25 is configured to scan either a plurality of radio channels as received by one particular radio signal receiver, e.g. receiver 22, from one and the same transmitter, in this case broadcast station 50, or the media scanner 25 is configured to scan a plurality of radio signal receivers 22, 23, 24 and a plurality of radio channels received in those receivers, for detection in any of those receivers of a media item as identified in the list. The list as shown in FIGS. 3 and 4 is preferably stored in a memory 27 connected to the media scanner 25. When a media item identified in the list is detected by media scanner 25, controller 21 is configured to output an indication on the user interface, to alert the user of the media player that the item in question is accessible. The alert signal may be to highlight the media item in question on display 12, e.g. by a frame as shown in FIG. 4, by using bold or differently colored letters, or by showing only currently detected media items on the display. Alternatively, or in addition, an audible alert signal may be used, such as a beep tone issued in a headset 17 or 20, or a built-in loudspeaker 15. Upon noticing the alert signal, the user may then maneuver the user input interface 11 to select one media item currently marked as detected, responsive to which a media selector 25 is configured to pass the media signals received relating to that media item to media player 28, for output to the user.

For broadcast media, the media signal is transmitted and received in real time, and the media item is playable only when received. Therefore, tuning in to the detected media item may lead to only parts of the media item being played if the first part of the item is missed. For this reason, the media player may in one embodiment be set to an automatic play mode, in which a first detected media item is automatically played after a preceding media item has finished.

For streaming media, though, the detection may be that the media item in question is accessible for streaming. However, initiation of the streaming reception may be actively controlled by the media player. Streaming radio therefore provides a better tool for a virtual radio station than broadcast media, since a new media item can be played immediately after a preceding media item is finished. When scanning several radio channels, and possibly also several types of bearers by means of different radio signal receivers 22, 23, 24, the situation may well occur that several of the media items on the list are simultaneously accessible. The user may then select which one to choose, by means of input interface 11 and media item selector 26. Alternatively, controller 21 may configured to run a random mode, in which one of a plurality of detected media items from the list is randomly selected by media selector 26 for output to the user.

Another feature is indicated in FIGS. 3 and 4, namely a "buy" tag and a "store" tag, which may be set to different values by the user input interface 11 and by controller 21 dependent on changed status for a certain media item. In FIG. 3, the first media item is marked by a "saved" icon, meaning that this particular media item has already been stored in a media item memory 29 in the media player. However, in order to facilitate listening this item has still been introduced in the wish playlist by the user, since the user wants to hear that track now and then without having to continuously having to maneuver the input interface 11. For e.g. contemporary music, the chance of a music track being accessible for reception by the media player is typically quite good. However, the third item is an older piece, and is not played as frequently. For this reason, the user has operated the user input interface to tag the store section. By doing so, media player 28 is configured to automatically store the media signal of that track in media file memory 29, when it has been detected by media scanner 25 that this track is accessible. When it has been stored, controller 21 will alter the tag in the store section to the icon representing saved, as shown for the first media item. If the quality of the stored item is poor, it may also be possible to tag the buy section using the user input interface 11, as shown for the fourth media item. Such tagging preferably triggers the media player to download the media item from a network server (not shown). Typically, a financial transaction is also involved, which may be cleared by billing or through a standard rate. Needless to say, it is preferably also possible to tag the buy section before the media item is stored from a received streaming radio signal.

The present invention therefore provides a time-saving and economically beneficial way of creating playlists of music which need not be locally accessible in the media player. When s song is streamed in a 3G network, information about the song (title, artist, album etc) is sent along with that song. Also when a song is broadcasted over FM, same kind of information (title, artist, album etc) could be sent over RDS, which some radio stations already do. The proposed solution acts as a wish playlist function in the media player, and the list of items may as such be an individually composed list with songs the user wants to hear, or the list may have been shared to the user. Preferably, all available streaming music channels (3G/Internet channels) are continuously scanned, and when possible also the FM channels. When a song on the list is played on one of the channels, the music player automatically indicates to the user that the song is available or accessible to listen to. For example the song could be presented in the ordinary play list in bold red text together with a beep tone in the headsets, if the media player is already used for listening to another music item at the moment.

Figure 5:
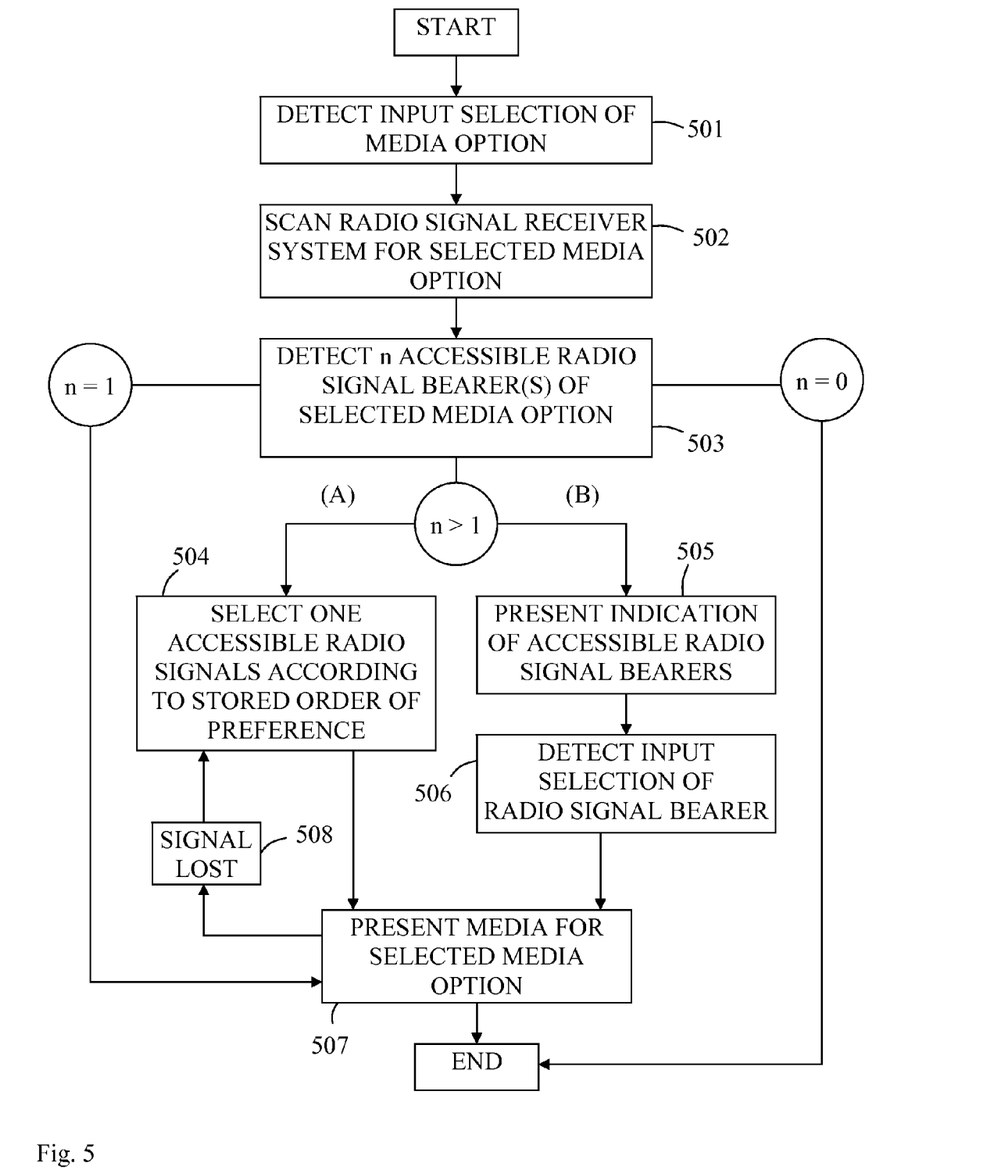
FIG. 5 is a flow chart schematically illustrating an example of how an embodiment of the invention may be used for receiving and presenting media in a terminal.

FIG. 5 shows a flow chart of a method according to an embodiment of the invention. The flow chart refers to media options as a general term, which may be a media channel, such as a radio channel or a television channel. Alternatively, the media options may represent specific media items, such as music tracks, radio or television shows, movies, and so on. As yet another alternative, the media options may be different podcasts, such as magazines or radio programs.

Specific embodiments directed to mobile television will now be described with reference to FIGS. 5 to 8. It is to be understood that the method as such is preferably carried out by a user operating his or her terminal 10, such as a mobile phone, by means of which a radio signal representing selected media is received and subsequently presented, on a built in or communicatively attached presentation device, such as display 12 or a speaker 14, 17, 20.

In one embodiment, the mobile terminal is configured to receive and present video. Terminal 10 is operable to enter a TV mode, in which different television channels may be selected. In the television mode, a number of different TV channels are separately selectable. This may be achieved by assigning number buttons on the keypad 11 such that each number represents one television channel. Thus, a channel may be associated with a specific key of the wireless media player, independent of the type of signal receiver/bearer.

Figure 6:
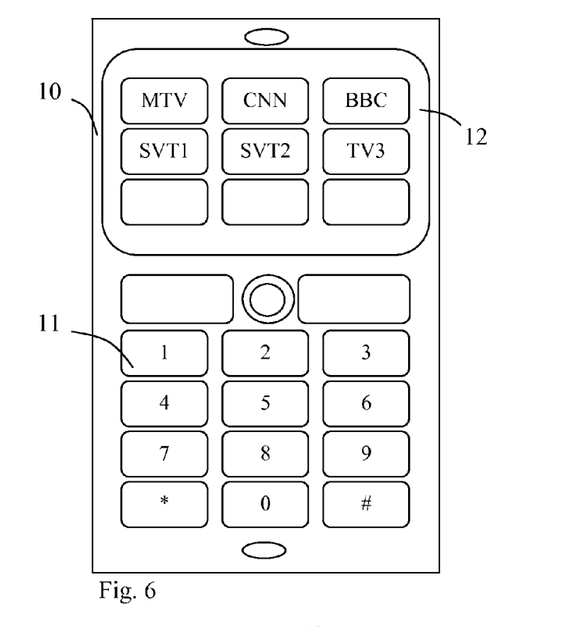
FIG. 6 schematically illustrates a mobile phone configured to receive and present video with shortcut keys.

FIG. 6 schematically illustrates a mobile phone configured to receive and present video with shortcut keys. As an example, key "1" may be configured to always mean MTV, key "2" representing CNN, key "3" representing BBC, key "4" representing SVT1, key "5" representing SVT2, key "6" representing TV3, and so on. This configuration may be pre-stored by a mobile phone operator, or the user may program these keys by him- or herself similar to speed dial buttons. Preferably, icons are presented simultaneously on the display 12.

Figure 7:
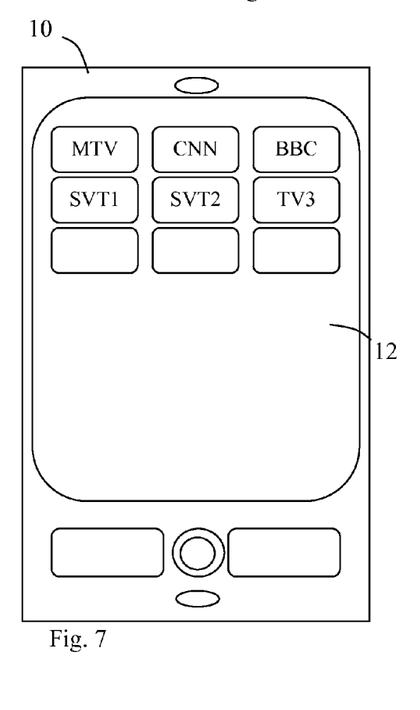
FIGS. 7 and 8 schematically illustrate a mobile phone configured to receive and present video with shortcut keys presented on a touch screen.
Figure 8:
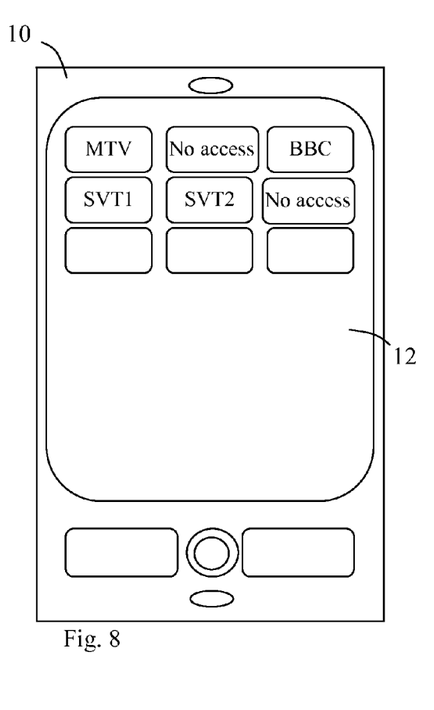

FIGS. 7 and 8 schematically illustrate a mobile phone configured to receive and present video with shortcut keys presented on a touch screen. As an alternative to using the keys of keypad 11, separate icons may instead be provided on display 12, preferably with the specific TV channel labels. Each channel may then be selected either by having a touch-sensitive display 12 operated by means of a stylus or by using a finger, or by means of a navigation tool, such as a joy stick.

In step 501, the user wanting to catch the news from CNN selects that TV channel by the appropriate input command, i.e. by pressing the linked number key or by clicking an icon on display 12 representing that channel, and the input is detected by controller 21 in terminal 10. Being in the TV mode, controller 21 also recognizes that the selection made represents CNN.

In step 502, the radio signal receiver system of the terminal is scanned for a radio signal containing TV channel CNN. Terminal 10 is configured to receive TV channels over at least two different bearers as previously described, such as in a DVB-h or DMB receiver 22, in a mobile communication receiver 23 for reception of media on a MBMS bearer, or in a WLAN receiver 24 connectable to a WLAN access point. Through at least the two latter receivers 23, 24, podcasts may also be received, which may be defined as yet another bearer type.

In step 503, it has been established how many different bearers are accessible for providing the selected media, i.e. TV channel CNN. If none of the currently accessible bearers can provide CNN, the process it terminated, preferably by presenting a "no access" message or the like to the user on display 12, as is shown in FIG. 8. If only one bearer, e.g. an MBMS TV link to the mobile network 30, is determined to be capable of providing the selected media, the media in question is preferably automatically accessed and presented to the user on display 12 in step 507. If a separate fee is required for accessing the selected media, the user may be prompted to give a go ahead signal before initiating streaming and presentation in step 507.

If the scanning determines that two or more different bearers are capable of providing the selected media, some form of selection of bearer must be made.

In alternative (A) shown in FIG. 5, a specific order of preference for the different bearers is stored in the terminal 10, e.g. in memory 27 of controller 21. Again, the order of preference may be pre-stored by an operator of phone manufacturer. Alternatively, and perhaps even preferably, the order of preference may be created or at least changed by the user of the terminal. As an example, a highest or first priority may be given to broadcast or multicast media over a mobile TV network, such as DVB-h, which is often free of charge. MBMS streaming TV over the phone network 30 may have a second priority, and streaming video over WLAN 40 may have third priority, since it generally provides smaller coverage than a terrestrial TV broadcasting or multicasting network 50 and a mobile phone network 30. A podcast of the media channel may have fourth, and lowest, priority, regardless of whether it is accessible through the phone network 30 or a WLAN connection 40. Needless to say, these examples of priority levels may be different than those mentioned, and may also differ for different media channels. The user may e.g. have a subscription to the mobile phone operator which provides certain TV channels for free, only charging for the traffic, and other channels for an extra fee. This may affect the priority given to that media channel.

In step 504, the order of preference stored in memory 27 is followed by media selector 26, such that the accessible media channel with highest priority is selected. In this example, this means that if CNN is detected to be accessible from a DVB-h receiver, that radio signal will be selected, and subsequently presented in FIG. 507. The bearer actually selected by media selector 26 may also be presented on display 12.

Should the selected signal to receive loose quality or even disappear, as indicated in step 508, control unit 21 returns to step 504 and selects the highest ranking accessible radio signal bearer instead. The switch may not go un-noticed, but still provides suitable means for the user to carry on watching the selected TV channel.

As a solution (B), alternative to automatic selection of bearer, the presently accessible bearers detected by media scanner 25 may be presented on display 12, as shown in step 505. The user may then decide which bearer to use by operating the user input, which is detected by control unit 21 in step 506, upon which media selector 26 provides the selected media signal for presentation in step 507. Though not shown, also this alternative may include a return loop from step 507 to step 505, should the selected signal become poor or disappear.

The embodiment as described with reference to FIG. 5 thereby provides a simple user interface for handling mobile media reception and presentation, such as mobile television, by always providing certain TV channels, or for that matter radio channels, on specified buttons or icons, in a transparent way that makes use of different bearers without the need for substantive user interaction.

A number of different specific embodiments of the invention can be obtained by minor adjustments of the method presented with reference to FIG. 5, as already mentioned. For one thing, the media option need not relate to video, but may instead be a radio channel. For radio, broadcasted FM radio may also be one bearer to scan. Furthermore, instead of a channel, the media item may refer to a particular item, such as a show, a track, a movie and so on.

In another embodiment, the invention does not have to include pre-stored keys or icons representing media options. Instead, a form of search engine may be included, in which it is possible to write a title of a song, show or movie, or the name of an artist or an album, and so on. By typing e.g. "Seinfeld", the radio signal receivers may be scanned for that show. In one embodiment, it is also possible to specify what type of search word is typed, such as TV channel, radio channel, song, movie, podcast, artist, album, and so on.

As previously mentioned, the process of FIG. 5 may in the presentation step 507 be combined with storing of the selected media option in a memory in the terminal, either automatically or upon command from the user. In one embodiment, the stored media is DRM protected, such that it may only be played in the receiving terminal 10, but may not be shared by transmission to other terminals.

The principles of the present invention have been described in the foregoing by examples of embodiments or modes of operations. However, the invention should not be construed as being limited to the particular embodiments discussed above, which are to be regarded as illustrative rather than restrictive, and it should be appreciated that variations may be made in those embodiments by persons skilled in the art, without departing from the scope of the present invention as defined by the appended claims.

We claim:
1. A wireless device, comprising:
a media player;
a radio signal receiver system configured to receive media signals;
a controller comprising a memory comprising a list of different media options, indicating media items the user is interested in taking part of and a media scanner configured to scan the radio signal receiver system to detect media content associated with the media options;
a user input interface to select one media item currently indicated as detected; and
a media selector configured to pass received media signals relating to the selected media item to the media player;
wherein the user interface is adapted to provide user input of the different media options prior to the media content associated with the media options being received by the radio signal receiver system.

2. The wireless device of claim 1, comprising:
a user interface, wherein the controller is configured to output an alert signal through the user interface to indicate that media content associated with the media options list has been detected by the media scanner.

3. The wireless device of claim 1, wherein the media options includes a plurality of different media items, the device comprising:
a user interface including a display operable to present a list of media items, wherein the controller is configured to highlight a media item on the display responsive to the media scanner detecting reception of that media item.

4. The wireless device of claim 3, wherein the media items include audio tracks.

5. The wireless device of claim 3, wherein the media items include video tracks.

6. The wireless device of claim 1, comprising
a media recorder configurable to automatically record a media item identified in the media options list, upon the controller detecting reception of that media item.

7. The wireless device of claim 6, wherein the controller is configured to add a link in the media options list to the recorded media item.

8. The wireless device of claim 1, comprising:
a user interface operable to add a buy tag to a media item in the media options list, wherein the controller is configured to access a media store through the media receiver system to download media data corresponding to media items marked by a buy tag.

9. The wireless device of claim 1, comprising
a media output configured to present received media to a user.

10. The wireless device of claim 9, wherein the media output comprises
a display.

11. The wireless device of claim 9, wherein the media output comprises
a speaker.

12. The wireless device of claim 9, wherein the media output comprises
a connector to an external media presentation device.

13. The wireless device of claim 1, wherein the radio signal receiver system comprises a plurality of different radio signal receivers configured to receive different types radio transmission.

14. The wireless device of claim 13, wherein the plurality of different radio signal receivers are configured to receive media signals in different radio bands.

15. The wireless device of claim 13, wherein the plurality of radio signal receivers comprises:
a first radio signal receiver configured to receive broadcast media;
a second radio signal receiver configured to receive streaming media.

16. The wireless device of claim 15, wherein the plurality of radio signal receivers comprises:
a radio signal receiver configured to receive podcast media.

17. A method for accessing a media channel in a wireless device, comprising the steps of:
providing a playlist of different media options, where each option includes a media item the user is interested in taking part of;
detecting access to one of the media items of the playlist through a radio signal receiver;
outputting an access indication signal on a user interface to alert a user that said media item is accessible; and
receiving user input through a user input interface to select one media item currently marked as detected, responsive to which a media selector passes received media signals for the selected media item to a media player;
wherein the playlist is user-defined and provided before media items associated with the corresponding media options in the playlist are received by the radio signal receiver.

18. The method of claim 17, wherein the step of outputting an access indication signal comprises the step of:
presenting a highlighted indication of said media item on a display.

19. The method of claim 17, wherein the step of outputting an access indication signal comprises the step of:
outputting an audible alert signal.

20. The method of claim 17, wherein the step of detecting access comprises the steps of:
scanning a plurality of different types of radio signal receivers for access to media items of the playlist.

21. The method of claim 17, wherein the step of detecting access comprises the steps of:
scanning a plurality of different media channels for access to media items of the playlist.

22. A method for accessing media channel in a wireless media player, comprising the steps of:
providing a playlist of different media options, where each option includes a media item;
detecting access to one of the media items of the playlist channel through a streaming radio signal receiver; and
recording the media item to a media file memory responsive to detecting access;
wherein the playlist is user-defined and provided before media items associated with the corresponding media options in the playlist are received by the radio signal receiver.

* * * * *